United States Patent Office 3,425,740
Patented Feb. 4, 1969

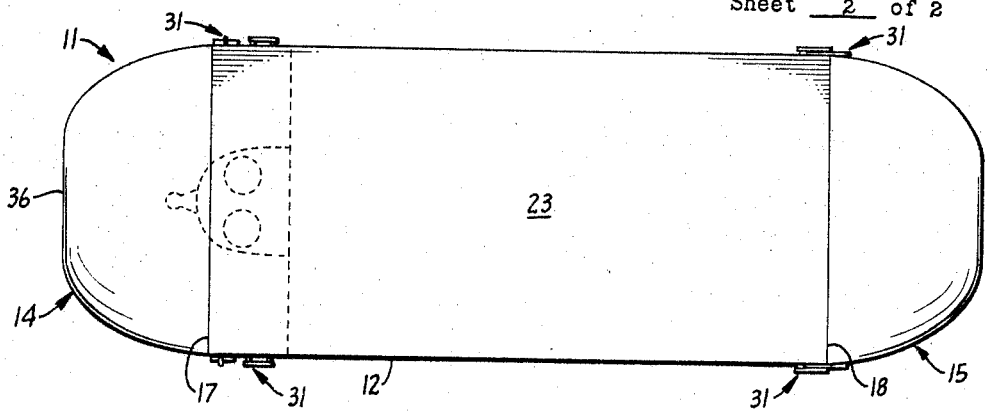
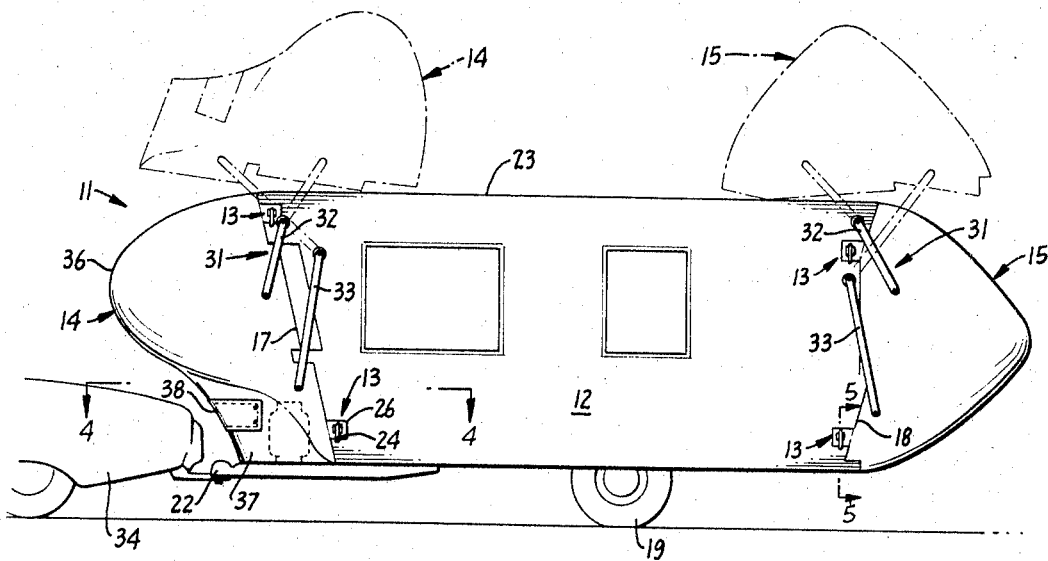
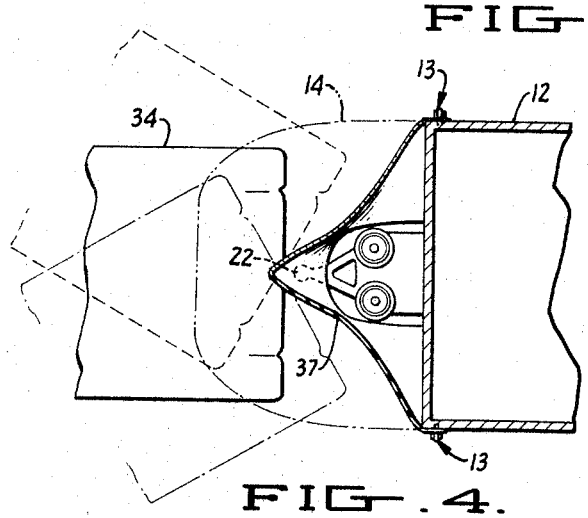
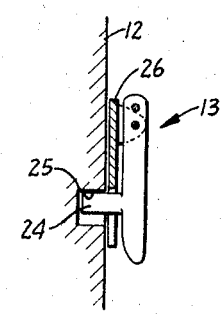

3,425,740
STREAMLINING APPARATUS
Marshall S. De Vaughn, 2200 Crocker Way,
Santa Clara, Calif. 95051
Filed Aug. 15, 1966, Ser. No. 572,604
U.S. Cl. 296—1  5 Claims
Int. Cl. B60j 7/12; B60r 27/00

ABSTRACT OF THE DISCLOSURE

An attachment for protecting and streamlining the ends of a house trailer having a rigid fairing member movable between a first station superimposed over and covering an end of the house trailer and a second station with a portion of the fairing member resting on top of the house trailer and another portion extending outwardly over the end of the trailer. Lift means for transporting the fairing member between the first and second stations is provided in the form of pairs of arms pivoted to the fairing member and the house trailer and formed to support the fairing member during its movement between the first and second stations.

---

This invention relates to streamlining apparatus and more particularly to fairings adapted to impart a more streamlined shape to a generally box-shaped vehicle such as a trailer.

Because of a comparatively large frontal area, wind resistance and drag on a moving trailer greatly increases power requirements and fuel consumption in the towing vehicle. Recent years have seen an enormous increase in the use of travel trailers and mobile homes. Only a few of these have attempted to create streamlined shapes in order ot cut down on wind resistance and drag. This is principally because the elongated, streamlined shape does not lend itself to efficient utilization of internal space. Hence, most travel trailers and mobile homes are essentially box-like in configuration.

While the desirability of streamlining has been realized for a number of years and some attempt has been made to provide streamlining fairings, these have generally proven unsuccessful because of undue weight, undue complexity, and interference with the intended function of the trailer. The present invention contemplates streamling apparatus adapted for use with existing box-shaped trailers without causing such problems. Indeed, the present apparatus enhances and increases the functionality of the trailer in its use as a mobile home.

It is therefore a principal object of the present invention to provide an apparatus for streamlining trailers and the like which may be used with existing box-like trailer designs to convert them to a more streamlined shape for traveling down the highway.

Another object of the present invention is to provide streamlining apparatus of the character described which is held firmly and securely in position on the trailer, but which may readily be removed as desired.

A further object of the invention to provide a streamlining apparatus of the character described which includes streamlining fairings adapted to be swung from their normal travel position at the ends of the trailer to a stowed position on the roof of the trailer so as not to interfere with windows or doors at the trailer ends when the trailer is at rest.

A still further object of the invention is to provide streamlining apparatus of the character described in which the fairings act as an awning or sunshade extending outwardly over the trailer ends when positioned on the roof of the trailer.

Another object of the present invention is to provide a streamlining apparatus of the character set forth which includes a fairing adapted to streamline the front end of the trailer and still leave room to accommodate the rear end of a close-coupled towing vehicle.

Other objects and features of the present invention will become apparent from the description and claims.

In the drawings:

FIGURE 2 is a plan view of the streamlining apparatus and trailer of FIGURE 1, with the streamlining apparatus depicted in its lowered or travel position.

FIGURE 3 is a side elevational view of the streamlining apparatus and trailer of FIGURE 2.

FIGURE 4 is a plan sectional view taken substantially on the plane of line 4—4 of FIGURE 3.

FIGURE 5 is a plan sectional view on an enlarged scale taken substantially on the plane of line 5—5 of FIGURE 3.

Figure 1:
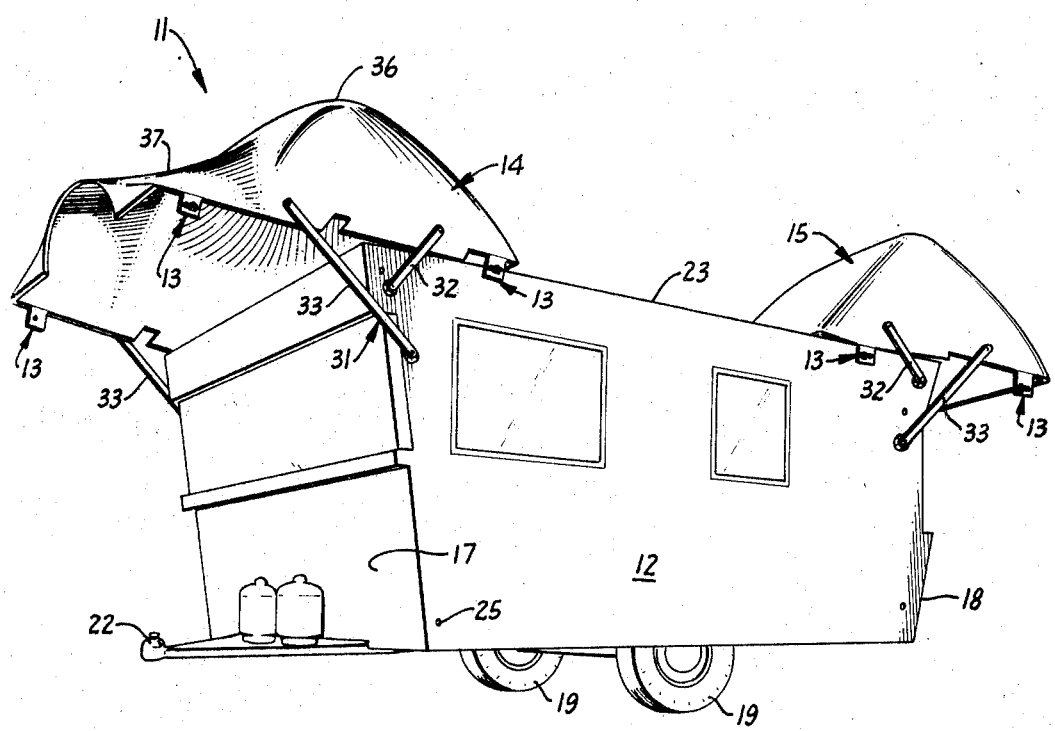
FIGURE 1 is a perspective view of a small house trailer having a streamlining apparatus constructed in accordance with the present invention and installed thereon, the appparatus being shown in the raised position used when the trailer is at rest.

While only the preferred forms of the invention are shown, it should be understood that various changes or modifications may be made within the scope of the claims attached hereto without departing from the spirit of the invention.

Referring to the drawings in detail, it will be seen that the streamlining apparatus of the present invention includes fairing means 11 having a configuration adapted to fit snugly onto an end of a generally box-shaped, trailer-like vehicle 12 so as to provide a more streamlined shape, together with attaching means 13 formed for releasably securing the fairing means in place on the end of the vehicle.

While but a single fairing may be used on either end of the vehicle 12, in most instances much more efficient streamlining is obtained by providing front and rear fairings 14 and 15 for the vehicle front and rear ends 17 and 18, respectively. In accordance with the invention, the peripheries of the fairings 14 and 16 have a configuration which permits them to fit snugly against the front and rear ends 17 and 18. This configuration, of course, will depend upon the configuration of the front and rear ends of the particular vehicle 12 with which the fairings are to be used, the vehicle 12 illustrated in FIGURES 1 through 4 of the drawings being a conventional small house trailer having the usual wheels 19 and conventional trailer hitch 22.

When it is desired to occupy the trailer 12, the fairings 14 and 16 are lifted into their stowed position on the roof 23, as depicted in phantom lines in FIGURE 3 of the drawing. In this position, the fairings 14 and 16 provide shade for portions of the roof 23 and extend outwardly over the trailer ends 17 and 18 to act as awnings or sun shades. Thus, when the fairings 14 and 16 are moved to their stowed position, both ends of the trailer are completely accessible and unobstructed.

Preferably, the fairings are of very light-weight, rigid construction in order to lessen dead weight on the trailer and to make more easy their movement between travel and stowed positions. These fairings may comprise hollow shells of fabricated metals or synthetic materials such as fiberglass, or could be solid or semi-solid in nature and cast of light-weight foamed plastic, preferably with a protective shell. Since the fairings attach to existing-type trailers, their structural strength requirements are minimal, the main stresses imposed on the fairings being wind loadings.

The attached means 13 may be of any suitable type which will securely lock the fairings 14 and 16 in their travel positions shown in solid lines in FIGURE 3 of the drawings, but which may at the same time be easily released for movement of the fairings to their stowed positions or for their removal from the trailer 12. As may best be seen in FIGURE 5, the attaching means 13 here comprises a plurality of manually-operable dogs 24 pivotally mounted on brackets 26 secured to and extending from the fairings 14 and 16 so as to overlie adjacent portions of the trailer body, the dogs being engageable in suitable recesses 25 provided in the structure of the trailer.

Lift means 31 is provided for facilitating the movement of the fairings 14 and 16 between their travel and stowed positions, see FIGURE 3, the lift means 31 being formed and proportioned so that a portion of each fairing overhangs the associated end of the trailer when the fairings are raised to the stowed position.

As here shown, the lift means 31 comprises pairs of arms 32 and 33 located on the opposite sides of the fairings, with one end of each arm being pivoted to its fairing and the other end being formed for pivotal attachment to the trailer. The position of arms 32 and 33 when the fairings are secured in place for travel is illustrated in solid lines in FIGURE 3 of the drawings, and the position of the arms when the fairings are in stowed position is illustrated in phantom lines. Because of the light-weight construction of the fairings 14 and 16, they may be readily moved from one position to the other, especially when supported on the arms 32 and 33. However, if desired, power means may be employed for moving the fairings between travel and stowed positions.

As a feature of the invention, the front fairing 14 is so constructed that it will not interfere with relative movement between the trailer 12 and towing vehicles such as automobiles 34. In order to obtain maximum streamlining affect and still accommodate this relative movement, particularly when making turns, the front fairing 14 is formed with a forwardly projecting rounded nose 36 and a downwardly extending central rib 37 adapted for substantially covering the trailer hitch 22. The rounded nose 36 and central rib 37 merge smoothly into each other to provide recesses at the opposite lower sides of the front fairing 14, and these recesses will accommodate the rear end of the towing automobile 34 as the automobile and trailer pivot relative to each other around the trailer hitch, see FIGURE 3 of the drawings. The central rib 37 also conveniently encloses the usual LP gas bottles, and an access door 38 may be provided for inspection.

Figure 6:
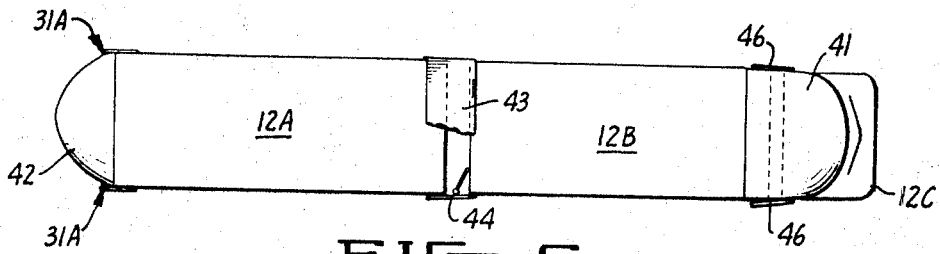
FIGURE 6 is a plan view on a reduced scale of a highway transport trailer rig having a modified form of the streamlining apparatus of the present invention mounted thereon.
Figure 7:
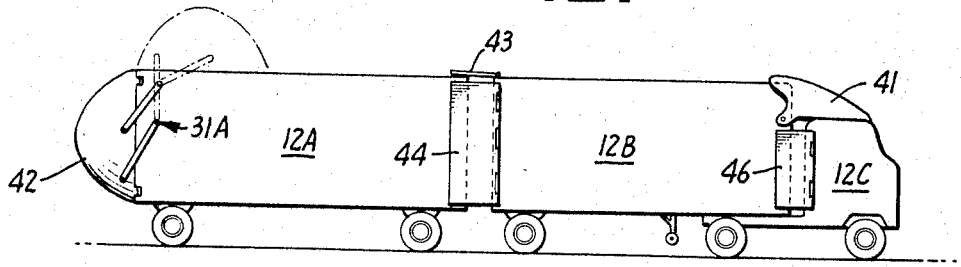
FIGURE 7 is a side elevational view of the trailer rig of FIGURE 6.

A modified form of the present invention is illustrated in FIGURES 6 and 7 of the drawings, wherein front and rear fairings 41 and 42 are applied to a vehicle having articulated sections, such as a commercial highway transport trailer rig. As here shown, the trailer rig consists of sections 12A and 12B pulled by a tractor 12C. In this form of the invention, the lift means 31A is generally similar to the lift means 31 of FIGURE 3, but preferably, in order to allow shortening of total vehicle length where required, the lift means 31A is formed and proportioned so that the rear fairing 42 does not overhang the rear end of trailer 12A when in its stowed position.

Improved streamlining is also obtained in the form of the invention shown in FIGURES 6 and 7 of the drawings by hingedly mounting top and side panels 43 and 44 on the forward trailer 12B in position to extend across the gap between the articulated sections 12A and 12B. Likewise, similar panels 46 may be mounted across the gap between the tractor 12C and the first trailer 12B.

From the foregoing, it will be seen that the streamlining apparatus of the present invention provides improved efficiency through streamlining of box-like trailers and the like for decreasing wind resistance and drag while at the same time improving the usability of the trailer.

I claim:
1. A combination streamlining fairing and awning attachment for a vehicle, comprising
a rigid member adapted for positioning at a first station in superimposed relation to an end of the vehicle and a second station with a portion of said member resting on top of the vehicle and another portion projecting outwardly over said end, said member being formed to protect and provide a more streamlined aspect to said vehicle end when at said first station and to provide a protective awning over said end when at said second station, and
lift means on said member adapted for operative engagement with the vehicle and formed for transporting said member between said stations.

2. A combination streamlining fairing and awning attachment for a vehicle as described in claim 1 and wherein said member is formed and proportioned to cover substantially the entire vehicle end when at said first station.

3. A combination streamlining fairing and awning attachment for a vehicle as described in claim 1 and wherein said lift means comprises pairs of arms pivotally attached to the opposite sides of said member and having their distal ends formed for pivotal attachment to the vehicle whereby said member may be swung back and forth between said first and second stations while supported on said arms.

4. Apparatus for streamlining trailers and the like, comprising
fairing means having a configuration adapted for snugly engaging an end of a generally boxed-shaped trailer-like vehicle so as to provide a more streamline shape,
attaching means operatively connected to said fairing means and formed for releasably locking said fairing means in place on said vehicle,
said fairing means including front and rear fairings of light weight rigid construction having configurations adapted to fit snugly against the front and rear ends respectively of the vehicle,
lift means formed for transporting said fairings between a first position snugly engaging the ends of the vehicle and a second position resting on top of the vehicle,
said lift means comprising pairs of arms pivotally attached to the opposite sides of said fairings and having their distal ends formed for pivotal attachment to the vehicle whereby said fairings may be swung back and forth between said first and second positions while supported on said arms.

5. In combination with a house trailer, an apparatus for protecting an end of said trailer comprising
a rigid member adapted for positioning at a first station in superimposed relation to said end and a second station with a portion of said member resting on top of said trailer and another portion projecting outwardly over said end, said member being formed to protect and provide a more streamlined aspect to said trailer end when at said first station and to provide a protective awning over said end when at said second station, and lift means is operatively connected to said member and said house trailer and is formed for transporting said member between said stations.

References Cited

UNITED STATES PATENTS

| | | | |
|---|---|---|---|
| 3,239,267 | 3/1966 | Reynolds | 296—15 |
| 2,737,411 | 3/1956 | Potter | 296—15 |
| 2,533,752 | 12/1950 | Alamagny | 296—15 |
| 2,514,695 | 7/1950 | Dempsey | 296—15 |
| 2,251,584 | 8/1941 | Fageol | 280—403 |

PHILIP GOODMAN, *Primary Examiner.*

U.S. Cl. X.R.

135—5; 280—403